United States Patent [19]

Nagano

[11] Patent Number: 4,580,670
[45] Date of Patent: Apr. 8, 1986

[54] HUB FOR A BICYCLE

[75] Inventor: Masashi Nagano, Izumi, Japan

[73] Assignee: Shimano Industrial Company Limited, Osaka, Japan

[21] Appl. No.: 563,773

[22] Filed: Dec. 21, 1983

[30] Foreign Application Priority Data

Dec. 27, 1982 [JP] Japan ............................ 57-201483[U]

[51] Int. Cl.$^4$ ........................ F16D 41/00; F16H 11/08
[52] U.S. Cl. ......................................... 192/64; 192/46; 474/160
[58] Field of Search ..................... 192/64, 46; 474/160

[56] References Cited

U.S. PATENT DOCUMENTS

| 4,226,317 | 10/1980 | Nagano | 192/64 |
| 4,230,212 | 10/1980 | Tsuchie et al. | 192/64 |
| 4,299,318 | 11/1981 | Segawa | 192/64 |
| 4,328,882 | 5/1982 | Isobe | 192/64 |
| 4,353,447 | 10/1982 | Bes | 192/64 |
| 4,461,375 | 7/1984 | Brown | 192/64 |
| 4,472,163 | 9/1984 | Bottini | 192/64 |

Primary Examiner—Henry C. Yuen
Attorney, Agent, or Firm—Stevens, Davis, Miller & Mosher

[57] ABSTRACT

A hub for a bicycle wherein a tubular support, having at its outer peripheral surface a non-circular cross-section, is provided at a hub shell which is supported rotatably to a hub shaft, a driven cylinder of a freewheel is fitted and fixed to the tubular support. The hub shell is provided with an elongate inner screw-threaded portion. A screw-threaded cylinder is provided which is adapted to have at one end an outer screw-threaded portion screwable with the inner screw-threaded portion and to have at its other end a projection which is engageable with one end of the driven cylinder, so that the screw-threaded cylinder is screwed with the hub shell to fix the driven cylinder to the hub shell.

2 Claims, 3 Drawing Figures ically, in a case in which a hub shell is provided with a freewheel, an axially outwardly extending tubular support is provided axially on one end of the hub shell, and a drive cylinder, which constitutes the freewheel, is fixed onto the outer periphery of the tubular support by means of press-fitting.

HUB FOR A BICYCLE

FIELD OF THE INVENTION

This invention relates to a hub for a bicycle, or more particularly, to a hub for a bicycle which comprises a hub shaft fixed to the frame of a bicycle, a hub shell rotatably supported on the hub shaft and a freewheel provided axially on one side of the hub shell.

BACKGROUND OF THE INVENTION

Conventionally, in a case in which a hub shell is provided with a freewheel, an axially outwardly extending tubular support is provided axially on one end of the hub shell, and a drive cylinder, which constitutes the freewheel, is fixed onto the outer periphery of the tubular support by means of press-fitting.

Furthermore, the freewheel consists of a driven cylinder having transmission pawls on the outer periphery thereof; a driving cylinder which has at least one sprocket wheel on the outer periphery thereof and a ratchet on the inner periphery thereof; and a pair of ball bearings provided between the driven cylinder and the driving cylinder a unidirectional rotation transmission mechanism is formed by the ratchet and transmission pawls, so that the freewheel operates to transmit the driving rotation in one direction of the driving cylinder to the driven cylinder through the unidirectional rotation transmission mechanism and to allow the driven cylinder to freely rotate with respect to the rotation in the other direction of the driving cylinder. The power transmitted to the driven cylinder is transmitted through the hub shell, to which the driven cylinder is fixed, onto a bicycle wheel supported to the hub shell mainly by spokes.

In the above-described conventional construction where there is also provided the conventional feature that the driven cylinder is pressfitted to the tubular support at the hub shell to assemble the freewheel therewith, it is extremely difficult to remove or dismantle the freewheel from the tubular support in case of replacement, for example, of damaged transmission pawls at the freewheel. Furthermore, the repeated removal and application of the driven cylinder with respect to the tubular support will develop the problem of causing looseness between the driven cylinder and the tubular support, with the result that they are not ensurely rigidly fit with each other.

A construction was previously designed by the present inventor in order to overcome this problem as described in Japanese Utility Model Application No. Sho 56-165,563 filed on Nov. 5, 1981. The previous invention is described as follows: The axial length of the tubular support at the hub shell is made longer than that of the driven cylinder and the driven cylinder is loosely mounted on the tubular support. The tubular support is provided an outer end periphery thereof with an outer screw-thread portion and an inner end periphery thereof with a large number of splines. A lock ring having a rotation operation portion at an axial outside surface is screwed onto the outer screw threaded portion of the tubular support, so that the driven cylinder which is coupled to the tubular support by splines is readily mountable to and removable from the tubular support. However, with the above mentioned invention, since it is inevitable to form the rotation operation portion for the lock ring at the axial outside surface thereof as abovesaid as a result of the construction of a freewheel, it is necessary for the rotation operation of the lock ring to use a special tool that is applied to the rotation operation portion formed at the lock ring to rotate the same when mounting or removing the driven cylinder with respect to the tubular support. Additionally, there arises a possibility of damage to the rotation operation portion. Furtheremore, it is impossible to lessen the axial length of the driven cylinder of the freewheel assembly because the driven cylinder must hold the transmission pawls, and since balls are provided on the end portions of the hub shaft in order to rotatably support the hub shell, the length of the tubular support is subjected to a limitation. It is also impossible to make larger the length of the screw-threaded portion provided on the end periphery of the tubular support, resulting in the problem of being unable to obtain a sufficient fixing efficiency of the lock ring screwed onto the screw threaded portion of the tubular support.

SUMMARY OF THE INVENTION

In the light of the above problem, the invention has been designed. The objective of this present invention is to provide a hub for a bicycle wherein it is possible to rigidly mount and fix a driven cylinder to a tubular support at the hub shell without the need of enlarging the axial length of the tubular support and to easily remove the driven cylinder therefrom. Even when it is repeated to mount and remove the driven cylinder with respect to the tubular support, it does not lead to the outcome of looseness or damage at the connection portion therebetween. At the same time the driven cylinder can be mounted and removed with a common tool, for example, such as a hexagonal wrench key.

Furthermore, the characteristic feature of this invention is, in a hub for a bicycle previously suggested, to provide that the hub shell is provided on the inner surface at the axial one side with an inner screw-threaded portion. A screw-threaded cylinder is provided which is adapted to be axially longer than the driven cylinder and to have at the longitudinal one end periphery of the screw-threaded cylinder an outer screw-threaded portion in mesh wth the inner screw-threaded portion. The screw-threaded cylinder has at the longitudinal other end an engaging means engaging with one end of the driven cylinder to lock the same and prevent its axial movement. The screw-threaded cylinder is also provided at its inner surface with an operation portion to control the advance or retreat of the screw threaded cylinder through the outer screw-threaded portion with respect to the inner screw-threaded portion at the hub shell, so that the driven cylinder is fixed to the hub shell by screwing up the screw-threaded cylinder to the hub shell.

As stated above, since this invention is constructed so as to fix the driven cylinder of a freewheel assembly to the hub shell by screwing up the screw threaded cylinder with an inner screw threaded portion provided at the hub shell, it is possible to make larger the inner screw-threaded portion in necessary length to an extent sufficient to fix the driven cylinder to the hub shell, and the operation portion at the screw-threaded cylinder can be made sufficiently long along the axial length of the screw-threaded cylinder.

Therefore, first it is possible to obtain a sufficient fixing strength of the driven cylinder by the thrust generated in screwing up of the screw threaded cylinder, and second it is possible to use a common tool such as a hexagonal wrench key in the operation of the screw-threaded cylinder. Additionally, since a sufficient length of the operation portion at the screw-threaded cylinder as aforesaid can be obtained, there arises no danger of causing damage to the operation portion even when it is repeated to mount and remove the driven cylinder.

Furthermore, since the driven cylinder is fixed by means of the screw threaded cylinder, the axial length of the tubular support provided at the hub shell can be reduced to the minimum length sufficient to prevent the rotation of the driven cylinder relative to the tubular support.

In addition, in this invention, the preferable embodiment of the engaging means provided at the screw-threaded cylinder is a radially outwardly extending projection, which is integral with the screw-threaded cylinder and it is more preferable to make this projection cone-shaped and to form at the end of the driven cylinder a cone-shaped recess for receiving the conical projection.

An embodiment of a hub for a bicycle according to the invention will be apparent in detail from the following description in accordance with the accompanying drawings.

DETAILED DESCRIPTION OF THE PREFERRED EMBODIMENT

Figure 1:
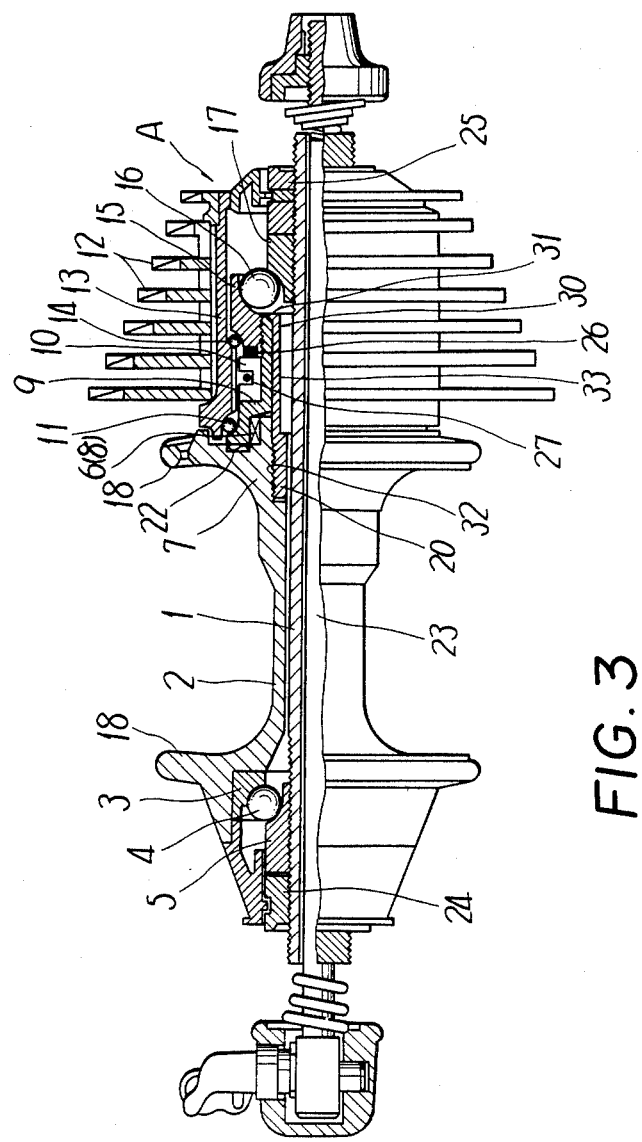
FIG. 1 is a partial sectional view showing an embodiment of a hub for a bicycle of this invention.

Shown in FIG. 1 is a quick release type hub wherein reference numeral 1 designates a hub shaft, reference numeral 2 is a hub shell into which the hub shaft and 1 is inserted. The hub shell is rotatably supported, at the left-hand end thereof, to the hub shaft 1 through a ball retainer 3, a ball 4 and a ball holder 5. The hub shell 2 is integrally provided, on the other end thereof, with a tubular support 7 having a large number of axial splines 6 at the outer periphery of the base thereof, and a freewheel A hereinafter explained. The freewheel A consists of a driven cylinder 9, a driving cylinder 13 having on the outer periphery thereof one through 7 sprocket wheels 12 as shown in FIG. 1, a unidirectional rotation transmission mechanism 10 described below and balls 11, 14 that rotatably support the driving cylinder 13 to the driven cylinder 9. The driving cylinder 13 is adapted, by means of the unidirectional rotation transmission mechanism 10 and balls 11, 14, to freely rotate in one direction relative to the driven cylinder 9. The ball 14 that supports one end side of the driving cylinder 13 is supported by a ball retainer 15 screwed onto the right-hand end of the driven cylinder 9. One end side of the driven cylinder 9 of the freewheel A is rotatably supported on the hub shaft 1 through a ball 16 and a ball holder 17 screwed onto the hub shaft 1. Moreover, the tubular support 7 is provided with two flanges 18, 18.

The unidirectional rotation transmission mechanism 10 is so constructed that the driving cylinder 13 is provided with serrated teeth 10a on the inner periphery thereof between balls 11, 14. The driven cylinder 9 is provided on the outer periphery thereof with transmission pawls 10b. The transmission pawls 10b comes into mesh with the serrated teeth 10a upon the positive rotation of the driving cylinder 13 to transmit the driving power thereof to the hub flanges 18, 18 through the driven cylinder 9 and the tubular support 7.

The freewheel A above constructed is mounted on the hub shell 2 through attaching and fixing the driven cylinder 9 to the tubular support 7. Explanation will now be given of the assembling construction. First, the driven cylinder 9 is provided on the inner periphery of the axially inner end thereof with the splines 8 engageable with the splines 6 formed on the tubular support 7. On the other hand, the hub shell 2 is provided on the inner periphery thereof at the side of the tubular support 7 with an inner screw-threaded portion 20 at a predetermined length. Separately from the hub shell 2 and driven cylinder 9, a screw threaded cylinder 30 is formed which is larger in length than the axial length of the driven cylinder 9. Cylinder 30 has on the outer periphery of one longitudinal end thereof an outer screw-threaded portion 32 screwable with the inner screw-threaded portion 20. The cylinder 30 has, on the other longitudinal end periphery thereof, an engaging means 31 engageable with the end of the driven cylinder 9 and also has, in the inner peripheral portion of the cylinder 30, an operation portion 33 at a predetermined length.

Next, the method of fixing the driven cylinder 9 of the freewheel A will be explained. First, the driven cylinder 9 is inserted into the tubular support 7 to engage the splines 6, 8 with each other, and the screw threaded cylinder 30 is inserted into the driven cylinder 9. The outer screw-threaded portion 32 at the cylinder 30 is screwed up onto the inner screw-threaded portion 20 formed in the hub shell 2, so that the engaging means 31 provided on the screw-threaded cylinder 30 is engaged with the end of the driven cylinder 9.

As stated above, it is possible to simplify the mounting operation of a freewheel A onto said tubular support 7 by coupling the splines 6, 8 and screwing up the screw-threaded cylinder to the hub shell 2, with the driven cylinder 9 thus being securely fixed to the tubular support 7.

Furthermore, in case of removing the driven cylinder 9 of the freewheel A from the support 7 for replacement of the driven cylinder 9, the components such as ball holder 17 and ball 16 located on the right-hand side of the screw threaded cylinder 30 are first removed. Screw threaded cylinder 30 is then removed and the freewheel A is pulled to the right-hand side so as to disengage the splines 6, 8 from each other.

As stated above, the removal of the freewheel A from the tubular support 7 is a simple operation of unscrewing the screw-threaded cylinder 30 and disengaging the coupling of splines 6, 8, and the mounting and removal of the screw-threaded cylinder 30 can be carried out with a common tool such as hexagonal wrench key without the need of a special tooling.

In order to support the freewheel A to the hub shell 2, the screw-threaded cylinder 30 is separately formed, and the hub shell 2 is provided with the inner screw-threaded portion 20 which is engageable with the screw-threaded portion 32 at the screw-threaded cylinder 30, so that the inner screw-threaded portion 20 can be made larger in length, to thereby more rigidly fix the screw-threaded cylinder 30 to the hub shell 2 to that extent, while also surely supporting the driven cylinder 9 to the hub shell 2.

Furthermore, since this invention is constructed so that the freewheel A is supported on the hub shell 2 by coupling the driven cylinder 9 of the freewheel A with the tubular support 7 and screwing up of the screw-threaded cylinder 30 to the hub shell 2, there arises no danger of causing looseness or damage at the hub or other parts even when it is repeated to remove the driven cylinder 9 from the tubular support 7.

Figure 3:
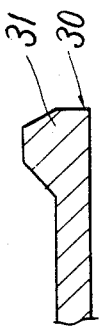
FIG. 3 is an sectional view showing a modified embodiment of the engaging means.
Figure 2:
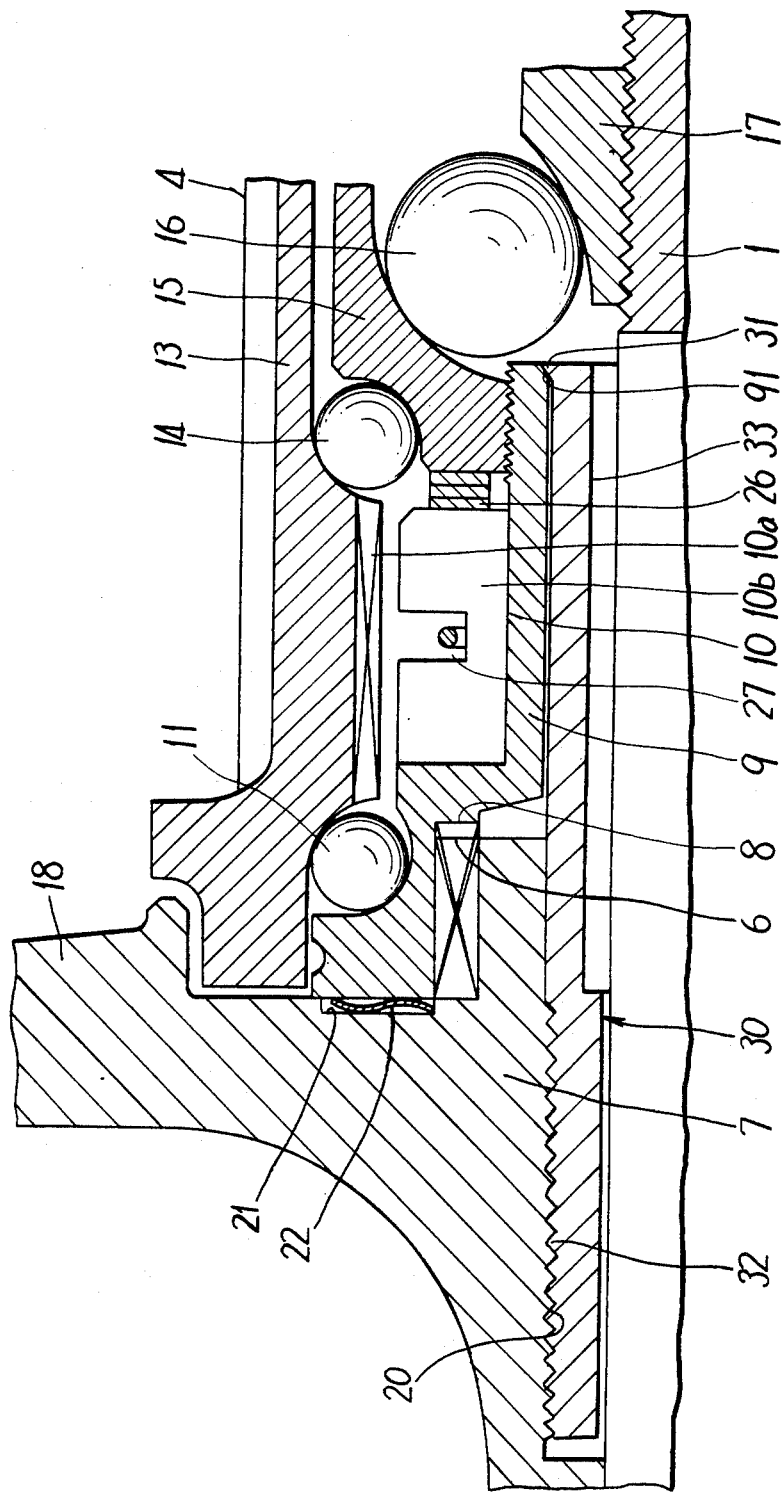
FIG. 2 is an enlarged sectional view of the principal portion of the hub in FIG. 1.

In this construction, while the engaging means 31 is formed by the projection which extends radially outwardly at the outer periphery of the outer end of the screw-threaded cylinder 30, it is possible to make the projection cone-shaped as shown in FIGS. 2 and 3 and to provide on the outer end of the driven cylinder 9 a cone-shaped recess 91 for receiving the engaging means 31 of the cone-shaped projection. As a result the fixing strength of the driven cylinder 9, is increased centering of the driven cylinder 9 relative to the hub shell 2 is achieved by screwing up of the screw-threaded cylinder 30. Moreover, it is also possible to achieve the centering of the driven cylinder 9 relative to the hub shell 2 by providing swollen portions of a predetermined axial length and height at the screw-threaded cylinder 30 on the outer surface of the outside end thereof, or at the driven cylinder 9 on the inner surface of the outside end thereof.

Furthermore, in the shown embodiment, an annular recess 21 is provided on the outside end face of the hub shell 2 radially outwardly of the tubular support 7, and an elastic member 22 such as a waved washer is arranged in the annular recess 21 to bias outwardly the driven cylinder 9 which is fitted to the support 7, i.e., in the direction of moving away from the hub shell 2. Such feature provides a prevention of loosening of the screw-threaded portions 20, 32, thereby eliminating an inadvertent or unexpected loosening of the screw threaded cylinder 30.

Furthermore, in FIGS. 1 and 2, reference numeral 23 is a rod for quick release and reference numerals 24, 25 are lock-nuts screwed onto the hub shaft 1. Also, reference numeral 26 is an adjuster plate provided between the unidirectional rotation transmission mechanism 10 and the ball holder 15, and reference numeral 27 is a ratchet spring.

While the above description pertains to the present invention as applied to a quick release hub, the invention is also applicable to various types of hubs which comprise a tubular support 7 formed at one axial end of the hub shell 2 and having on the outer periphery of the base of the support a large number of axial splines 6; a driven cylinder 9 internally provided with the splines 8 engagable with the splines 6; and a freewheel A consisting of the driven cylinder 9 and a driving cylinder 13 that is supported thereto through the unidirectional rotation transmission mechanism 10 and to has sprockets 12 on the outer periphery of the driving cylinder 13, so that the freewheel A is supported on the tubular support 7 by coupling of the driven cylinder 9 with the tubular support 7.

As explained above, since the invention is constructed so that the screw threaded cylinder is formed to have, at one end thereof, engaging means engageable with the end of the driven cylinder of a freewheel, and to have at the outer periphery of the other end of the screw-threaded cylinder an outer screw-threaded portion engaging with the inner screw-threaded portion formed in the hub shell. The driven cylinder of a freewheel is coupled to the tubular support, so that the freewheel is supported on the hub shell by screwing up the screw-threaded cylinder to the hub shell. Hence, it is possible to carry out the mounting of the freewheel onto the tubular support merely and simply by coupling the driven cylinder to the tubular support and screwing up the screw-threaded cylinder onto the hub shell. Additionally, mounting and removal of the screw-threaded cylinder does not require a special tool as in the conventional art but can employ a common tool such as a hexagonal wrench key for the purpose, with the result that workablity is remarkably improved.

Furthermore, since the screw-threaded cylinder is separately made, and since an inner screw-threaded portion which is screwable with the outer screw-threaded portion of the cylinder is provided on the hub shell, it is possible to lengthen the inner screw-threaded portion, thereby increasing the fixing efficiency of the screw-threaded cylinder relative to the hub shell to that extent. Hence, the driven cylinder can be more surely supported to the tubular support. Moreover, there arises no danger of causing looseness or damage at the hub and the specific parts, even when it is repeated to remove the driven cylinder from the tubular support.

While the form of embodiment of the invention as herein described constitutes a preferred form, it is to be understood that other forms might be adopted, all coming within the scope of the following claims.

What is claimed is:

1. A hub for a bicycle comprising:
   a hub shaft,
   a hub shell rotatably supported to said hub shaft and including at one axial side of said hub shell a tubular support which has at its outer peripheral surface a non-circular cross-section,
   a freewheel including a driven cylinder fitted to said tubular support at said hub shell such that said driven cylinder is substantially non-rotatable with respect to said tubular support, a driving cylinder having at least one sprocket wheel, and a unidirectional rotation transmission mechanism interposed between said driven cylinder and said driving cylinder, said hub shell including on its inner peripheral surface at one axial side an inner screw-threaded portion, and
   a screw-threaded cylinder having a length larger than an axial length of said driving cylinder, having at an outer periphery on one longitudinal end an outer screw-threaded portion screwable with said inner screw-threaded portion at said hub shell, having on another longitudinal end an engaging means engageable with one end of said driven cylinder to lock said driven cylinder to prevent axial movement thereof, said engaging means including a cone-shaped projection which extends radially and outwardly at an outer periphery on said another longitudinal end of said screw-threaded cylinder; said one end of said driven cylinder comprising a cone-shaped recess for receiving said cone-shaped projection of said engaging means; and also having an operation portion enabling said screw-threaded cylinder to advance and retreat with respect to said inner screw-threaded portion of said hub shell, whereby said driven cylinder is adapted to be fixed to said hub shell by screwing said screw-threaded cylinder with said hub shell.

2. A hub for a bicycle according to claim 1, wherein an elastic means is disposed between said driven cylinder and said hub shell to bias said driven cylinder in a direction away from said hub shell.

* * * * *